(12) United States Patent
Chang et al.

(10) Patent No.: US 10,277,789 B2
(45) Date of Patent: Apr. 30, 2019

(54) CAMERA DEVICE

(71) Applicant: Quanta Computer Inc., Taoyuan (TW)

(72) Inventors: Jung-Wen Chang, Taoyuan (TW); Chien-Hung Lin, Taoyuan (TW)

(73) Assignee: QUANTA COMPUTER INC., Guishan Dist., Taoyuan (TW)

(*) Notice: Subject to any disclaimer, the term of this patent is extended or adjusted under 35 U.S.C. 154(b) by 0 days.

(21) Appl. No.: 15/869,520

(22) Filed: Jan. 12, 2018

(65) Prior Publication Data
US 2019/0068851 A1    Feb. 28, 2019

(30) Foreign Application Priority Data
Aug. 24, 2017    (TW) .............................. 106128733 A

(51) Int. Cl.
G02B 7/02     (2006.01)
G03B 17/12    (2006.01)
H04N 5/225    (2006.01)

(52) U.S. Cl.
CPC ........... H04N 5/2254 (2013.01); G02B 7/021 (2013.01); G03B 17/12 (2013.01); H04N 5/2253 (2013.01)

(58) Field of Classification Search
CPC combination set(s) only.
See application file for complete search history.

(56) References Cited

U.S. PATENT DOCUMENTS
2017/0111578 A1* 4/2017 Eromaki .............. H04N 5/2258

FOREIGN PATENT DOCUMENTS
CN    206226564 U    6/2017
TW    200947272 A    11/2009

* cited by examiner

Primary Examiner — Paul M Berardesca
(74) Attorney, Agent, or Firm — McClure, Qualey & Rodack, LLP

(57) ABSTRACT

A camera device is provided, which is switchable between an unfolded state and a folded state. The camera device includes a first lens module and a second lens module. The first and second lens modules are rotatably connected and respectively have a first optical lens and a second optical lens. When the camera device is in the unfolded state, the first and second optical lenses face a first direction. When the camera device is switched from the unfolded state to the folded state, the second optical lens module is rotated from a first position to a second position with respect to the first optical lens module, and the second optical lens faces a second direction, wherein the first direction is opposite to the second direction.

8 Claims, 4 Drawing Sheets

CAMERA DEVICE

CROSS REFERENCE TO RELATED APPLICATIONS

This application claims the benefit of Taiwan Patent Application No. 106128733, filed on Aug. 24, 2017, the entirety of which is incorporated by reference herein.

BACKGROUND OF THE INVENTION

Field of the Invention

The application relates in general to a camera device, and in particular to a camera device that includes a plurality of lens modules.

Description of the Related Art

With the development of science and technology, camera technology is progressing day by day. At present, there are panorama cameras that can capture panorama photo, and stereo cameras that are used for shooting three-dimensional images to give people a richer visual experience. However, people are also thriving on the miniaturization, portability and functionality of electronic products. Therefore, it is an important issue to miniaturize the product and provide various functions.

BRIEF SUMMARY OF INVENTION

To address the deficiencies of conventional products, an embodiment of the invention provides a camera device which is switchable between an unfolded state and a folded state, primarily including a first lens module and a second lens module. The first and second lens modules are rotatably connected and have a first optical lens and a second optical lens, respectively. The fields of view of the first and second optical lenses are at least greater than 180°. When the camera device is in the unfolded state, the first and second optical lenses are facing a first direction. When the camera device is switched from the unfolded state to the folded state, the second optical lens module is rotated from a first position to a second position relative to the first optical lens module, and the second optical lens faces a second direction, wherein the first direction is opposite to the second direction.

In some embodiments, the camera device further comprises a state sensor disposed on the first lens module, wherein the state sensor is configured to sense whether the camera device is in the unfolded state or the folded state.

In some embodiments, the state sensor is an infrared sensor, and when the state sensor is covered by the second lens module, the state sensor senses that the camera device is in the unfolded state.

In some embodiments, the camera device further comprises an image processing unit, wherein when the camera device is in the unfolded state, the image processing unit combines the images captured by the first and second optical lenses into a left-right image.

In some embodiments, the camera device further comprises an image processing unit, wherein when the camera device is in the folded state, the image processing unit combines the images captured by the first and second optical lenses into a panoramic image.

In some embodiments, the first lens module has a first engaging portion, and the second lens module has a second engaging portion, and when the camera device is in the unfolded state, the first and second engaging portions engage each other.

In some embodiments, the first lens module has a first magnetic element, and the second lens module has a second magnetic element, and when the camera device is in the folded state, the first and second magnetic elements are corresponding to each other in the direction of the first optical axis of the first optical lens.

In some embodiments, when the camera device is in the folded state, the first optical axis of the first optical lens coincides with the second optical axis of the second optical lens.

In some embodiments, the camera device further comprises a sensor configured to sense whether the camera device is in a horizontal posture or a vertical posture when in the unfolded state.

In some embodiments, the camera device further comprises a control unit, and when the sensor senses that the camera device is in the vertical posture when it is in the unfolded state, the control unit closes the first or second optical lens.

BRIEF DESCRIPTION OF DRAWINGS

The invention can be more fully understood by reading the subsequent detailed description and examples with references made to the accompanying drawings, wherein.

DETAILED DESCRIPTION OF INVENTION

The making and using of the embodiments of the camera devices are discussed in detail below. It should be appreciated, however, that the embodiments provide many applicable inventive concepts that can be embodied in a wide variety of specific contexts. The specific embodiments discussed are merely illustrative of specific ways to make and use the embodiments, and do not limit the scope of the disclosure.

Unless defined otherwise, all technical and scientific terms used herein have the same meaning as commonly understood to one of ordinary skill in the art to which this invention belongs. It should be appreciated that each term, which is defined in a commonly used dictionary, should be interpreted as having a meaning conforming to the relative skills and the background or the context of the present disclosure, and should not be interpreted by an idealized or overly formal manner unless defined otherwise.

Figure 1:
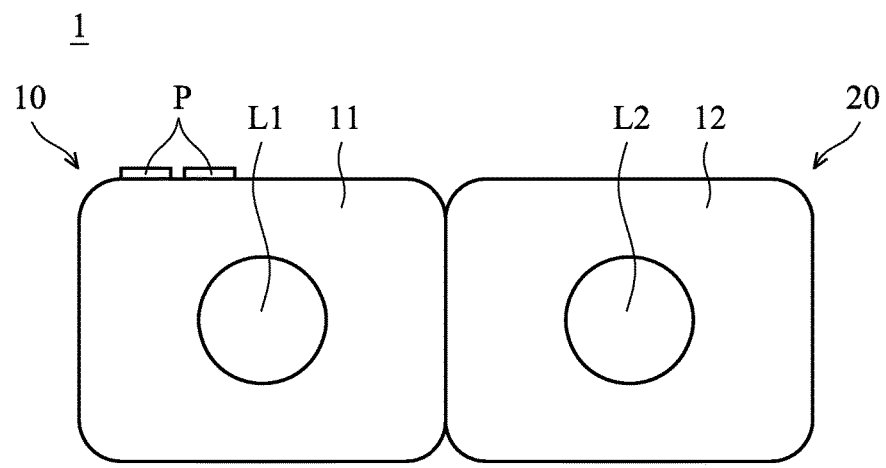
FIG. 1 is a schematic diagram of a camera device according to an embodiment of the invention.

FIG. 1 is a schematic diagram of a camera device 1 according to an embodiment of the invention. As shown in FIG. 1, the camera device 1, for example, may be a camera able to take photographs or record video, primarily comprising a first lens module 10 and a second lens module 20 which respectively have a first optical lens L1 and a second optical lens L2. The first and second lens modules 10 and 20 respectively have housing 11 and housing 21 which are used to protect these lenses. The optical lenses L1 and L2 are configured to receive light from the outside, and when the light passes through the optical lenses L1 and L2 to the image sensors (not shown) within the first and second lens modules 10 and 20, an image can be obtained. Furthermore, a plurality of operating members P are disposed on the first lens module 10, which may be buttons used for shooting or selecting, for the convenience of users.

Figure 2:
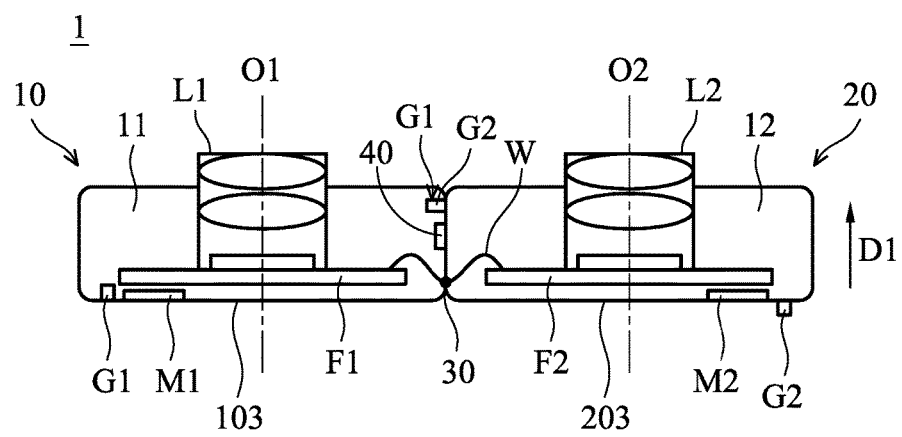
FIG. 2 is a bottom view diagram of the camera device in an unfolded state (perspective diagram).

Referring to FIG. 2, which shows another view (bottom view) of the camera device 1 in FIG. 1. The field of view of each of the optical lenses, namely first optical lens L1 and second optical lens L2, are greater than 180°. Circuit boards F1 and F2, disposed in the housings 11 and 12, may be flexible printed circuit boards and can be connected to each other by a wire W. In an embodiment, the circuit board F1 and F2 and wire W can be implemented as a circuit board assembly. Moreover, the aforementioned image sensor can be installed on the circuit board F1 (and/or circuit board F2) for converting optical signals into electronic signals.

Figure 3:
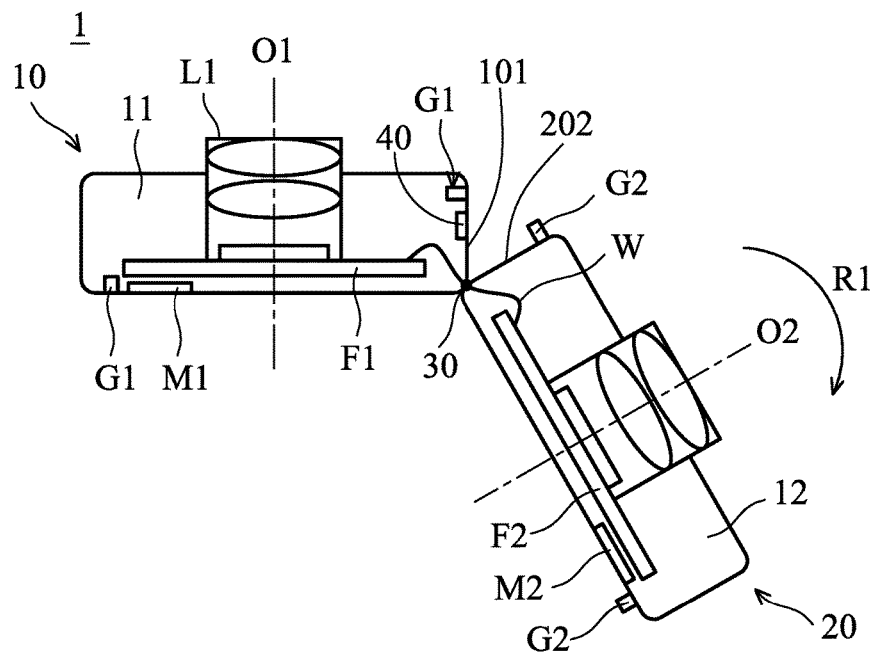
FIG. 3 is a schematic diagram of the second lens module rotating relative to the first lens module.

Please refer to FIGS. 2 and 3, wherein FIG. 3 is a schematic diagram that shows the second lens module 20 rotating relative to the first lens module 10. The camera device 1 further comprises a hinge module 30 (such as a single pivot or a double pivot) pivotally connecting the first to the second lens modules 10 and 20, so that the second lens module 20 is rotatably connected to the first lens module 10. As shown in FIG. 3, the second lens module 20 is rotated relative to the first lens module 10 in rotation direction R1.

Figure 4:
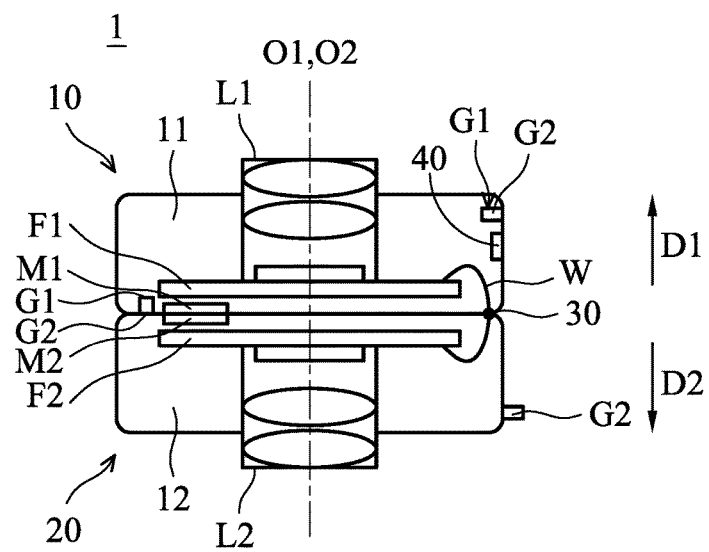
FIG. 4 is a schematic diagram of the camera device in a folded state.

Please refer to FIGS. 2 to 4. In FIG. 2, the camera device 1 is in an unfolded state; and in FIG. 4, the camera device 1 is in a folded state. Specifically, when the second lens module 20 (including the second optical lens L2) is rotated (the rotation direction R1 in FIG. 3) from a first position (FIG. 2) relative to the first lens module 10 (including the first optical lens L1) to a second position (FIG. 4), the camera device 1 is switched from the unfolded state to the folded state. While in the unfolded state, the first and second optical lenses L1 and L2 are both oriented in the first direction D1, and the first and second optical axes O1 and O2 of the first and second optical lenses L1 and L2 are arranged in parallel. While in the folded state, the second optical lens L2 is facing (toward) the second direction D2 which is opposite the first direction D1, and the first and second optical axes O1 and O2 of the first and second optical lenses L1 and L2 are coincident (in another embodiment, the first and second optical axes O1 and O2 may not coincide).

The camera device 1 further comprises a state sensor 40, such as an infrared sensor, disposed on a lateral side 101 of the first lens module 10 (see FIG. 3, for example, on the lateral side of the housing 11) for determining the current state of the camera device 1. As shown in FIG. 2, when the camera device 1 is in the unfolded state, the state sensor 40 is shielded (or covered) by the second lens module 20. When switching to the folded state, the second lens module 20 is rotated below the lens module 10 so that the state sensor 40 is unshielded. In this way, the state of the camera device 1 can be determined by whether the state sensor 40 is shielded or not.

When the state sensor 40 senses that the camera device 1 is in the unfolded state (FIG. 2; the state sensor 40 is shielded), an image processing unit of the camera device 1 (for example, provided on the circuit board F1 and/or the circuit board F2) combines the images captured by the first and second optical lenses L1 and L2 into a left-right image (stereoscopic image). In this case, the camera device 1 is in a stereo shooting mode, and the left-right image is stored into a storage unit (for example, a memory, disposed on the circuit board F1 and/or the circuit board F2), and the left-right image can be viewed through a Virtual Reality (VR) lens. Similarly, when the state sensor 40 senses that the camera device 1 is in the folded state (FIG. 4), the image processing unit makes an image stitching for the images captured by the first and second optical lenses L1 and L2 to synthesize a panoramic image. In this case, the camera 1 is in a panoramic shooting mode, and the panoramic image can also be stored in the storage unit.

Therefore, a user can switch the state of the camera device 1 (between the unfolded and folded states) by rotating the second lens module 20, and the camera device 1 can automatically switch the stereo or panoramic shooting mode and can shoot left-right images or panoramic images through the first and second optical lenses L1 and L2. Thus, the user can greatly increase the usage of shooting modes without setting the shooting mode, and can view images taken in different modes (for example, by transmitting the captured images to a display screen through a transmitting unit of the image capturing device 1) to enjoy a rich visual experience.

In addition, as shown in FIG. 2, the camera device 1 further comprises a plurality of first engaging portions G1, a plurality of second engaging portions G2, a first magnetic element M1 and a second magnetic element M2. Those components are used for strengthening the connection strength between the first lens module 10 and the second lens module 20. In detail, when in the unfolded state (FIG. 2) the first engaging portion G1 (formed on the side 101 of the first lens module 10) is matched with (or engaged with) the second engaging portion G2 (formed on the side 202 of the second lens module 20; the positions of the sides 101 and 202 please refer to FIG. 3) to stabilize the camera device 1. When the user rotates the second lens module 20 from the first position to the second position (relative to the first lens module 10), as shown in FIG. 4, the second engaging portion G2 located on the bottom side 203 is matched with (or engaged with) the first engaging portions G1 on the bottom side 103 (the positions of the bottom sides 103 and 203 are shown in FIG. 2), and the first and second magnetic elements M1 and M2 are corresponding to each other (for example, they attract each other) in the direction of the first optical axis O1 (or second optical axis O2), so that the stability of the camera device 1 in the folded state can be enhanced. In the present embodiment, the first engaging portions G1 are grooves, and the second engaging portions G2 are protruding structures.

It should be understood that, in another embodiment, one or all of the first engaging portions G1 may be a protruding structure, and one or all of the second engaging portions G2 may be a groove. In another embodiment, the camera device 1 may also include only one first engaging portion G1 and one second engaging portion G2, respectively formed on side 101 and side 202. In the unfolded state, the camera device 1 is stabilized by the matching first and second engaging portions G1 and G2; in the folded state, the first and second lens modules 10 and 20 are fixed to each other through the first and second magnetic elements M1 and M2. In another embodiment, the second lens module 20 may be provided with a receiving recess for receiving the second engaging portion G2 (for example, a pivot pivotally connected to the second engaging portion G2 so as to be rotatable into the receiving recess). In an unfolded state, the second engaging portion G2 on the bottom side 203 can be received; in the folded state, the second engaging portion G2 on the side 202 can be received. Therefore, in this way, the second engaging portion G2 can be prevented from interfering with the user's operation of the device.

Figure 5:
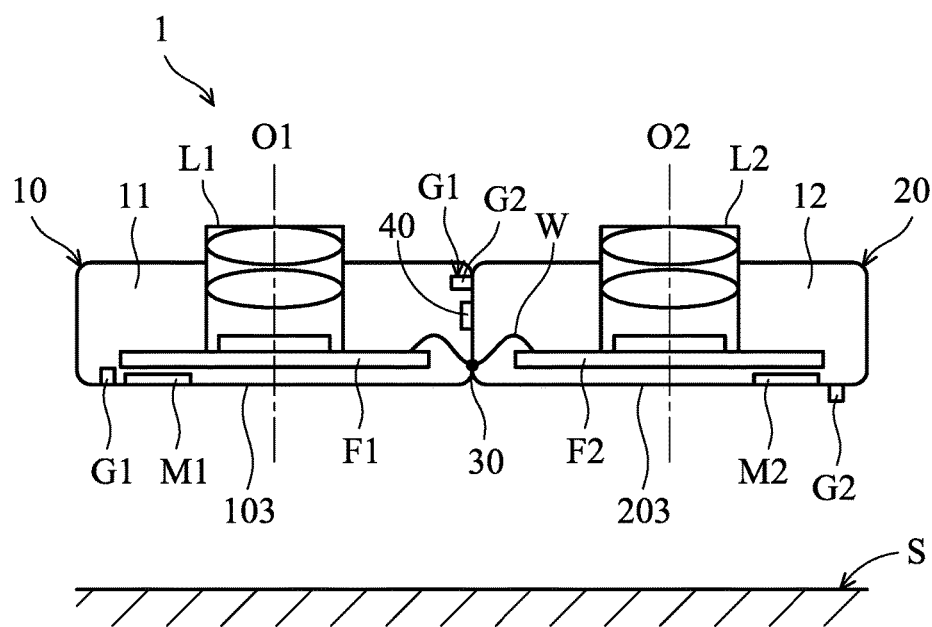
FIG. 5 is a schematic diagram of the camera device in a horizontal posture while it is in the unfolded state relative to a plane.
Figure 6:
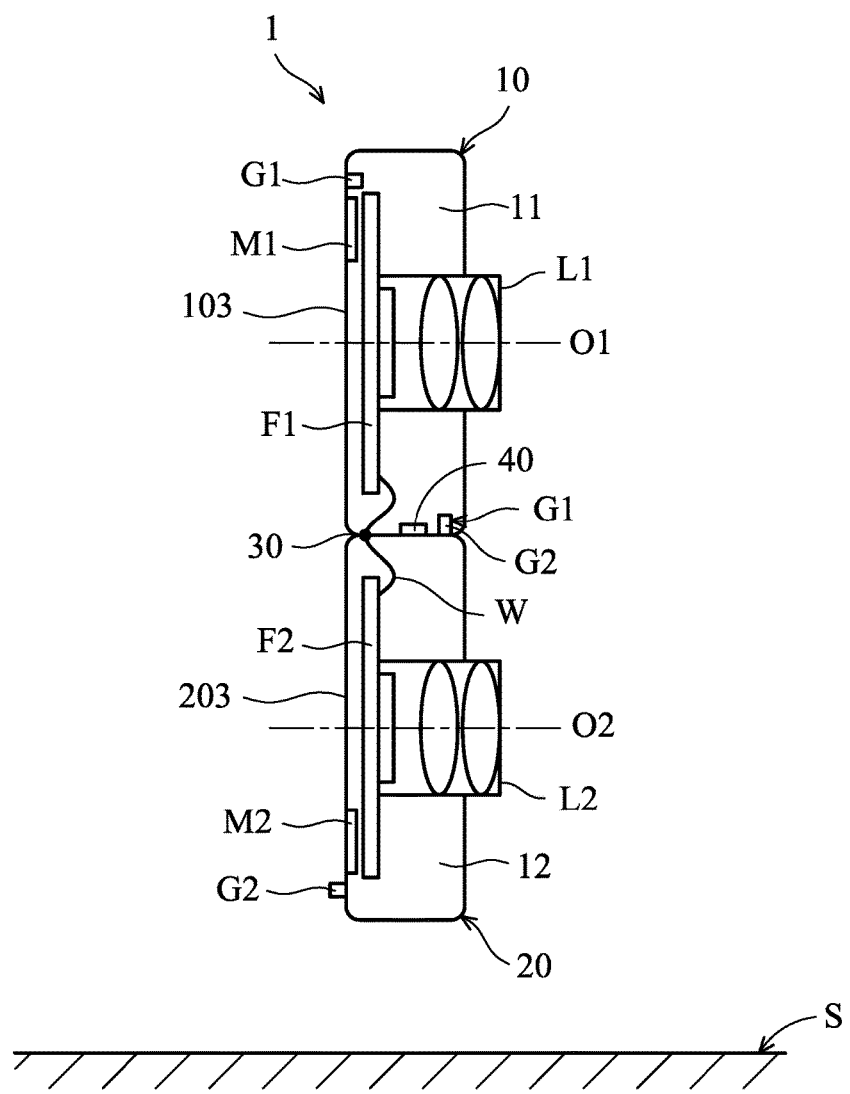
FIG. 6 is a schematic diagram of the camera device in a vertical posture while it is in the unfolded state relative to a plane.

FIGS. 5 and 6 are diagrams showing the horizontal posture and the vertical posture of the camera device 1 in the unfolded state. As shown in FIG. 5, the bottom side (such as the bottom sides 103 and 203) of the camera device 1 is substantially parallel to a plane S (for example, a desktop). In this case, the camera device 1 is in a horizontal posture. When the camera device 1 is rotated, and the first and second optical lenses L1 and L2 are arranged in an up-and-down direction (still in the unfolded state) with respect to the plane S, as shown in FIG. 6, in this case, the camera device 1 is in a vertical posture. In some embodiments, when a sensor (such as a gravitational acceleration sensor or a gyroscope sensor disposed on the circuit boards F1 and F2) of the camera device 1 senses that the current posture of the camera device 1 is in the vertical posture, a control unit (for example, disposed on the circuit boards F1 and F2) of the camera device 1 will close/turn off the first optical lens L1 (when the power of the camera device 1 is turned on) according to the sensor signal. In this state, the camera device 1 is in a normal photographing mode, and the user can use the second optical lens L2 for shooting. The first optical lens L1 is automatically closed to save power in the vertical position, so as to enhance the endurance of the camera device 1. In some embodiments, in the vertical position, the user can also set the opening/closing of the first optical lens L1 via the operating member P to shoot the desired image. In another embodiment, the control unit closes/turns off the second optical lens L2 according to a signal that indicates that the camera device 1 is in the vertical posture as sensed by the sensor.

In summary, a camera device is provided, which is switchable between an unfolded state and a folded state, primarily including a first lens module and a second lens module. The first and second lens modules are rotatably connected and have a first optical lens and a second optical lens, respectively. The fields of view of the first and second optical lenses are at least greater than 180°. When the camera device is in the unfolded state, the first and second optical lenses are facing a first direction. When the camera device is switched from the unfolded state to the folded state, the second optical lens module is rotated from a first position to a second position relative to the first optical lens module and the second optical lens is facing a second direction, wherein the first direction is opposite to the second direction. In an embodiment of the present invention, the current state of the camera device is sensed through a state sensor. Furthermore, in the unfolded state, the camera device is in the stereo shooting mode. The imaging processing unit of the camera device synthesizes (combines) the images captured by the first and second optical lenses into a left-right image (stereoscopic image). In the folded state, the camera device is in a panoramic shooting mode. The image processing unit combines the images captured by the first and second optical lenses into a panoramic image. The camera device has a composite function capable of capturing panoramic images and stereoscopic images (left-right images), and the panoramic or stereoscopic shooting mode can be switched automatically by detecting the current state of the camera device by the state sensor. Therefore, the user no longer needs to switch the shooting modes by himself or herself so as greatly enhance the convenience of use.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

It will be apparent to those skilled in the art that various modifications and variations can be made in the invention. It is intended that the standard and examples be considered as exemplary only, with a true scope of the disclosed embodiments being indicated by the following claims and their equivalents.

What is claimed is:

1. A camera device, switchable between an unfolded state and a folded state, comprising:
   a first lens module, having a first optical lens;
   a second lens module, having a second optical lens, wherein the first and second lens modules are rotatably connected, and the fields of view of the first and second lenses are at least greater than 180°;
   wherein when the camera device is in the unfolded state, the first and second optical lenses are facing a first direction, and when the camera device is switched from the unfolded state to the folded state, the second optical lens module is rotated from a first position to a second position relative to the first optical lens module and the second optical lens is facing a second direction, wherein the first direction is opposite to the second direction;
   a sensor, configured to sense whether the camera device is in a horizontal posture or a vertical posture when in the unfolded state; and
   a control unit, wherein when the sensor senses that the camera device is in the vertical posture in the unfolded state, the control unit closes the first or second optical lens.

2. The camera device as claimed in claim 1, further comprising a state sensor disposed on the first lens module, wherein the state sensor is configured to sense whether the camera device is in the unfolded state or in the folded state.

3. The camera device as claimed in claim 2, wherein the state sensor is an infrared sensor, and when the state sensor is covered by the second lens module, the state sensor senses that the camera device is in the unfolded state.

4. The camera device as claimed in claim 1, further comprising an image processing unit, wherein when the camera device is in the unfolded state, the image processing unit combines the images captured by the first and second optical lenses into a left-right image.

5. The camera device as claimed in claim 1, further comprising an image processing unit, wherein when the camera device is in the folded state, the image processing unit combines the images captured by the first and second optical lenses into a panoramic image.

6. The camera device as claimed in claim 1, wherein the first lens module has a first engaging portion, and the second lens module has a second engaging portion, and when the camera device is in the unfolded state, the first and second engaging portions engage each other.

7. The camera device as claimed in claim 1, wherein the first lens module has a first magnetic element, and the second lens module has a second magnetic element, and when the camera device is in the folded state, the first and second magnetic elements are corresponding to each other in the direction of the first optical axis of the first optical lens.

8. The camera device as claimed in claim 1, wherein when the camera device is in the folded state, the first optical axis of the first optical lens coincides with the second optical axis of the second optical lens.

* * * * *